United States Patent

[11] 3,632,267

| [72] | Inventor | Reiner Kader |
| | | Holzlar, Germany |
| [21] | Appl. No. | 806,597 |
| [22] | Filed | Mar. 12, 1969 |
| [45] | Patented | Jan. 4, 1972 |
| [73] | Assignee | Kautex-Werk Reinold Hagen |
| | | Rheinland, Germany |
| [32] | Priority | Mar. 12, 1968 |
| [33] | | Germany |
| [31] | | P 17 04 162.2 |

[54] APPARATUS FOR MAKING HOLLOW ARTICLES OF THERMOPLASTICS
13 Claims, 13 Drawing Figs.

[52] U.S. Cl. ............................................. 425/326, 425/387, 425/455
[51] Int. Cl. ............................................. B29d 23/03
[50] Field of Search........................................... 18/3 LM, 3 LC, 2 NM, 5 BE, 5 BC, 5 BM, 5 BB, 5 BJ, 5 BP, 5 BA, 5 BR

[56] References Cited
UNITED STATES PATENTS

| 2,167,724 | 8/1939 | Murphy et al ................ | 18/2 NM X |
| 2,853,736 | 9/1958 | Gussoni ....................... | 18/5 BJ |
| 2,913,762 | 11/1959 | Knowles ....................... | 18/5 BJ |
| 2,953,815 | 9/1960 | Mainardi ...................... | 18/5 BJ UX |
| 3,100,913 | 8/1963 | De Matteo..................... | 18/5 BJ |
| 3,116,877 | 1/1964 | Moslo........................... | 18/5 BJ X |
| 3,174,181 | 3/1965 | Langecker..................... | 18/2 NM |
| 3,353,215 | 11/1967 | Haller........................... | 18/2 NM |
| 3,408,691 | 11/1968 | Ruekberg...................... | 18/5 BJ |
| 3,479,690 | 11/1969 | Hagen ........................... | 18/5 BP |

*Primary Examiner*—J. Spencer Overholser
*Assistant Examiner*—Michael O. Sutton
*Attorney*—Edwin E. Greigg ABSTRACT: The specification describes apparatus for manufacturing hollow plastic articles such as bottles. Injection mold halves and blow mold halves are carried by a fixed and a reciprocable mounting plate to open and close injection and blow mold cavities. Mandrels are carried by a rotatable member so that a mandrel in each injection mold cavity with a parison injection molded thereon, can be swiveled into a blow mold, while a further mandrel leaves the blow mold, has the blown bottle stripped therefrom, and enters the injection mold. When the molds are closed a further parison is injected and a further bottle blown.

APPARATUS FOR MAKING HOLLOW ARTICLES OF THERMOPLASTICS

The present invention relates to apparatus for the manufacture of hollow articles of thermoplastic material.

Hollow articles of thermoplastic material are frequently manufactured in such a way that first a tube-shaped premolding or parison is fabricated which subsequently is expanded in a hollow blow mold to its final shape with the help of a pressure medium, usually compressed air. The parison can be made by injection molding and can be placed into a hollow mold together with a mandrel which forms the core of the injection mold where the parison, which is generally closed at one end, is expanded by means of a pressure medium which is fed in by way of the mandrel. Injection molding of the parison has a number of technical advantages. Thus, in general, the wall thickness of the parison can be predetermined and maintained very accurately, which has also a favorable effect on the wall thickness of the finished article. Furthermore, the finished article generally has no water material which has finally to be removed from it, since no superfluous material has normally to be pinched off the prison in the hollow blow mold. This leads to a further advantage in that the finished article is formed without welding seams.

The known apparatus for the manufacture of hollow bodies of thermoplastic material, where the parison is made by injection molding, is however of rather complicated design and is expensive. The resulting economic drawback of relatively high costs has led to such equipment being used only to a limited extent in practice.

The vast majority of hollow articles blown from a parison are made by using equipment where the starting object is a length of extruded tube. This length of tube generally has a length which is a little greater than the length of the finished article to be made, so that squeezing off operations have to be carried out on both ends of such a parison in the hollow mold, which lead to the formation of welding seams. This may be a drawback. Furthermore, it is somewhat difficult with extruded parisons accurately to maintain a specific wall thickness. Here too devices are known which allow a control of the wall thickness during the extrusion process. However, under normal circumstances it is never possible to achieve the accuracy which can be accomplished by forming the parisons by injection molding. The essential advantage however of equipment where the parison is made by extrusion consists in its cheapness. It should be borne in mind that hollow bodies of thermoplastic material, especially bottles and similar containers, are generally mass-produced articles which predominantly serve for packaging purposes. Under such circumstances economic considerations will generally be decisive in the choice of the most appropriate equipment. It is also for such reasons that today the vast majority of hollow bodies of thermoplastic material are made by the use of premolding fabricated in the extrusion process.

According to the invention there is provided apparatus for the manufacture of hollow articles of thermoplastic material, such apparatus comprising a fixed mounting plate and a reciprocable mounting plate, at least one pair of cooperating injection mold halves, one mold half of the or each pair being carried by each mounting plate, at least one pair of cooperating blow mold halves, one mold half of the or each pair being carried by each mounting plate, means for moving the reciprocable mounting plate between a position in which the or each pair of injection and blow mold halves is closed, and a position in which they are open, a pair of oppositely extending hollow blowing mandrels associated with the or each pair of injection and blow mold halves, so that one mandrel of a pair is located in an injection mold and the other in a blow mold when these are in the closed position, means to rotate the or each pair of mandrels about a common axis, whereby the mandrel that was located in an injection mold can be swiveled into a blow mold and vice verse, means for moving the or each pair of mandrels axially when the mold halves are in their open position and means for stripping a hollow article from a mandrel as it leaves the blow mold.

According to a preferred embodiment the fixed mounting plate is mounted on the frame of the apparatus, the mold halves are mounted laterally outwardly of the fixed mounting plate and the reciprocable mounting is mounted exteriorly of said mold halves. With such an arrangement, the parts required for the shaping represent a projection laterally from the frame, so that the molds under normal circumstances will always be at some distance from the floor, a free space is available underneath the molds and the mounting plates, which can be used for the fitting or placing of devices which can receive the finished hollow articles and carry them away and/or give them further treatment.

It has been found to be particularly appropriate to arrange the blow mold underneath the injection mold, because the mandrels then extend vertically inside the blow mold. This has the advantage, at least in the case of the majority of the hollow bodies to be made with such apparatus, especially bottles, that these, on opening of the mold, assume a position which is particularly favorable for an orderly passing of these to downstream equipment. The hollow body merely needs to be stripped off the mandrel, whereupon it drops vertically downwards.

The manufacture of parisons in the injection molds presupposes the existence of an extruder which directly collaborates with the injection mold. In the arrangement and design of the parts that has been described it is possible and advantageous to arrange the extruder above the equipment in such a way that it runs essentially horizontally and extends from the injection mold backwards, which allows a compact, but nevertheless clear, construction of the total layout. This applies in particular if the extruder runs vertically to the parting plane of the mold. If, as assumed in connection with the arrangement and design of the molds, the mandrels inside the blow molds point vertically downwards, these mandrels when they are inside the injection molds will normally point vertically upwards. Such an arrangement with a horizontal extruder requires the use of a crosshead injection head through which the thermoplastic material is deflected from its horizontal direction of flow inside the extruder vertical downwards into the injection mold. The use of such a crosshead injection head has the advantage that the free ends of the mandrels collaborating with the injection mold can rest on the injection head during the injection process. This may be important because with increasing length of the mandrels, the free ends of these have the tendency, under the influence of the material injected at high pressure, to be deflected slightly towards the sides, which affects the quality of the parison. This deflection is avoided, if, during the injection step the free end of the mandrels can rest on the injection head. The crosshead injection head offers a good opportunity for this, and in particular because each of the injection nozzles of the crosshead injection head is provided with a core which during the injection process runs axially to its corresponding mandrel of the injection mold and which is in a position to receive the forces arising at the resting and to divert them in a suitable manner upwards into the housing of the injection head.

The invention provides furthermore, that at least the reciprocable mounting plate is formed in two separately movable parts, one part carrying one or more injection mold halves, and the other part one or more blow mold halves. In this way, it is possible to take care of the fact that the locking force for the blow mold is considerably lower than the locking force for the injection mold. Thus it is possible to rate the drive and the other parts associated with the blow mold correspondingly lower, since they have to deal with forces which are substantially smaller than the parts associated with the injection mold.

Preferably each pair of mandrels is carried by a mounting member, which is rotatable about an axial shaft perpendicular to the mandrels, each mandrel carrying a valve rod slidable lengthwise in the bore in the mandrel and provided with a valve cooperable with the free end of the mandrel to open and close the bore therein, the radially inner end of each valve rod being positioned in a separate recess in the mounting member, which opens into the face of the mounting member opposite the shaft, said mounting member being axially movable to a location in which the recess associated with each valve rod locates in a blow mold, when the latter is closed, receives a bushing, which cooperates with said radially inner end of the valve rod to move the latter, and its associated valve head, to open the bore in the mandrel, whereby pressure medium entering through said bushing, discharges from the mandrel into the blow mold.

In order that the invention may more readily be understood, the following description is given, merely by way of example, reference being made to the accompanying drawings, in which.

The apparatus illustrated in FIGS. 1 to 4 of the drawings consists essentially of a screw extruder 10, a mounting unit 11 carrying injection molds 12 and blow molds 13. These molds are divided into halves, the mold halves 12a and 13a being carried by a reciprocable mounting plate 15, and the mold halves 12b, 13b by a fixed mounting plate 14. The molds are designed as multiple molds in such a way that in the injection molding station and in the blow molding station there are always at least two mold cavities 12' and 13' present.

Several mandrels 16 are provided, one for each mold cavity 12', 13' present in the molds 12 and 13. These mandrels 16 have a double function, serving both as cores in the injection mold cavities 12' and as blowing mandrels in the blow mold cavities 13'. At their inner ends, the mandrels are carried by a mounting member 17, carried by a shaft 18 which moves inside a sleeve 19 so that it can be displaced longitudinally and rotate about its axis. The shaft 18 is provided with longitudinal grooves or splines 20, into which engage springs 21 on the sleeve 19. To the latter is fitted a pinion 22 which is actuated intermittently by way of a rack 23. Between pinion 22 and sleeve 19 an overriding clutch is inserted so that the sleeve 19 can be driven only in one direction.

The shaft 18, on its end remote from the member 17, is provided with a recess 24, into which engages an adjustable threaded pin 25, which is screwed into the outer threaded zone 27 of the recess 24, and is locked by a plate 28 which acts as a locknut. At the same time the plate 28 engages a helical spring 29, the other end of which rests against the sleeve 19. When the molds 12 and 13, which do not participate in the swivel movement of the member 17 and mandrels 16, are opened, this is done by a displacement of the mounting plate 15 in the direction of arrow 30, the parts 16 to 29 first participate in this movement, i.e., the mandrels 16 remain in contact with the mold halves 12a, 13a secured to the mounting plate 15. This contact remains effective until the threaded pin 25 pushed against a part of the frame serving as a stop 31. Thus the movement of the member 17 is forcibly brought to an end, and continued movement of the mounting plate 15 and the sleeve 19 takes place in relation to the now stationary splined shaft 18 with simultaneous compression of the spring 29. In this second phase of the movement, the mold halves 12a, 13a associated with the mounting plate 15 are separated from the mandrels 16. The threaded pin 25 comes to rest against the stop 31 when the mounting plate 15 has covered half the opening path in the direction of the arrow 30. In this way, the mandrels 16 are situated in the center between the halves of the opened molds 12 and 13. Thus, the finished bottles 32 can be swiveled out of the blow molds together with the mandrels carrying them, the molds being opened sufficiently to permit this.

Figure 1:
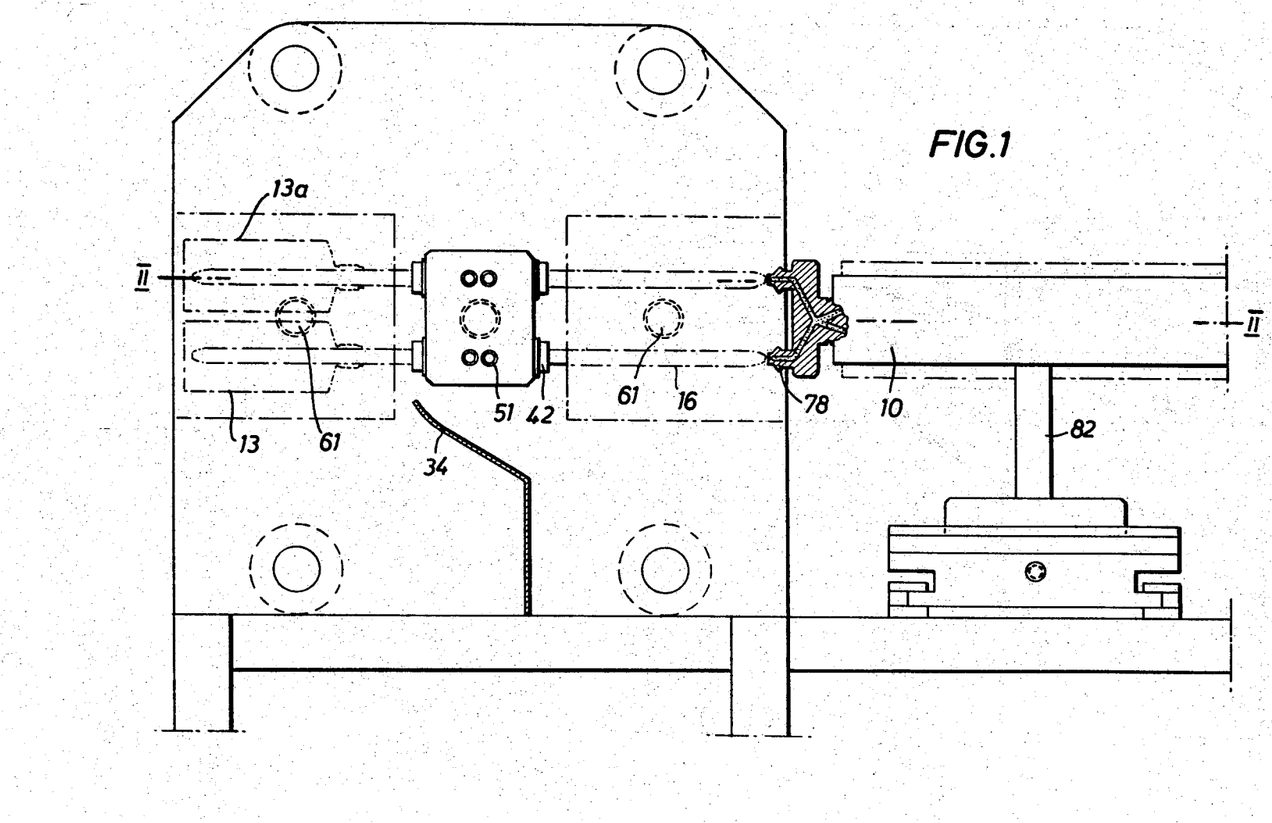
FIG. 1 is a front elevation of one embodiment of apparatus according to the invention, shown partly in section.
Figure 2:
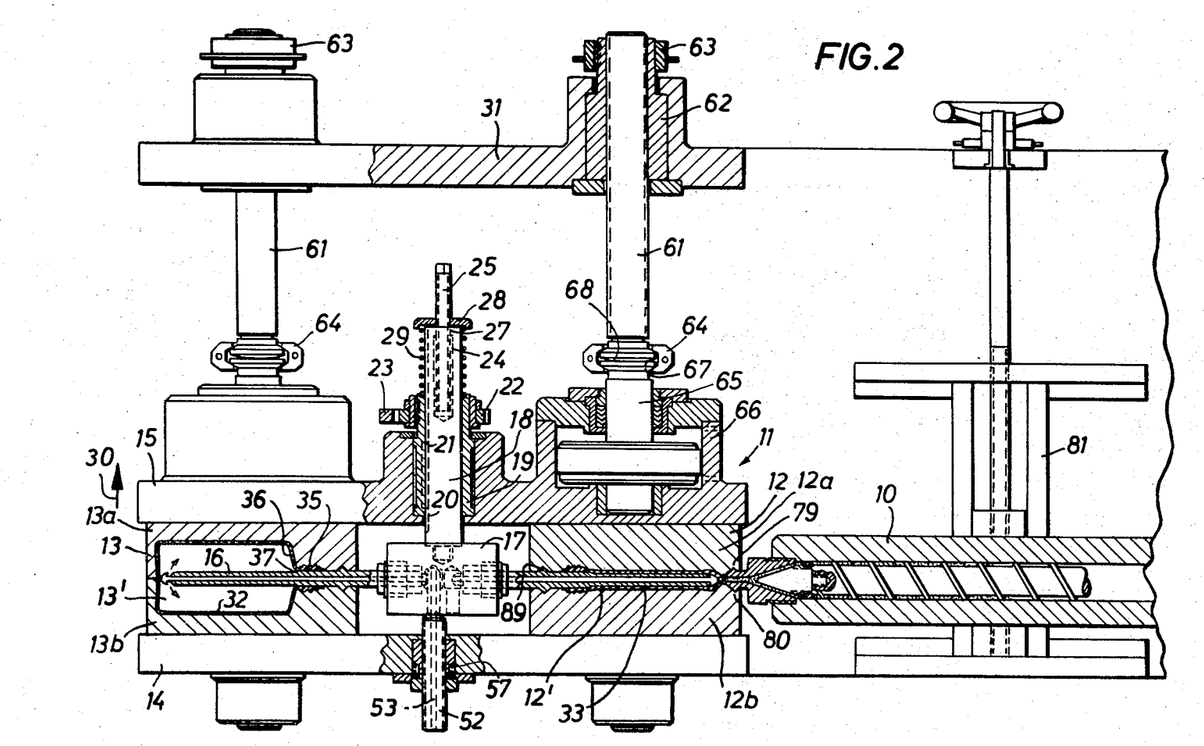
FIG. 2 is a section taken on line II—II of FIG. 1.
Figure 3:
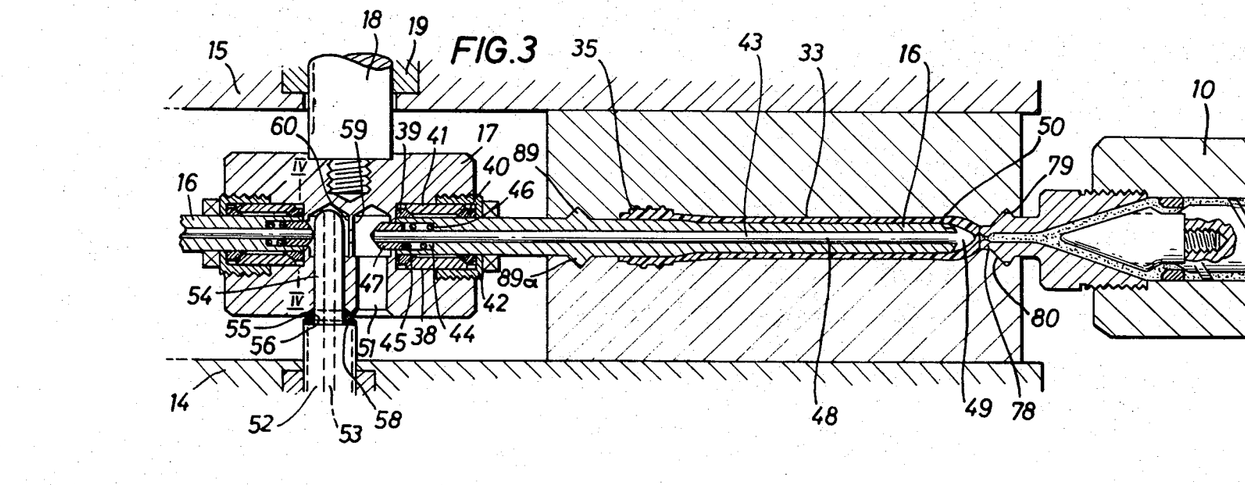
FIG. 3 is a detail of FIG. 2 on a larger scale.
Figure 4:
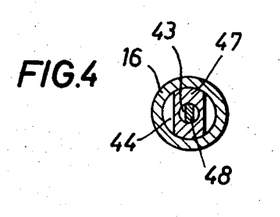
FIG. 4 is a section taken on the line IV—IV of FIG. 3.

When the opening movement of the mounting plate 15 has been completed, the mandrel mounting member 17 is turned 180° by means of the rack 23 and the pinion 22. The result is a corresponding swiveling of the mandrels 16 so that the just fabricated parisons 33 are passed from the injection mold 12 jointly with the mandrels carrying them to between the halves 13a, 13b of the blow mold 13. At the same time the finished articles 32 previously fabricated in the blow mold cavities 13' are stripped off on a stationary stripper 34 (FIG. 1). To facilitate this process the mandrels 16 are slightly recessed at the transition of the bottle neck 35 to the body of the bottle 36, that is at 37 (FIG. 2). Furthermore, it is possible, to facilitate the removal from the mold by giving the part of the mandrel which carries the bottle neck 35 a slight taper.

In the following closing movement of the mounting plate 15 in a direction opposite to that indicated by the arrow 30, in the first place the spring 29 associated with the shaft 18 is released, whereupon the shaft 18 is moved by the mounting plate 15, into the position shown in FIG. 2.

The mandrel mounting member 17 is provided with a number of recesses 38 (FIG. 3) corresponding to the number of mandrels 16, into which the mandrels 16 can be inserted. The fixing of the mandrels is effected by two clamping rings 39 and 40, the inside faces of which rest against the mandrels 16 and outer shell faces of which are provided with tapered or bevelled surfaces, against which rest the corresponding bevels of a third ring 41. On the outer ring 40 of the two split rings acts a nut 42 by means of which the rings 39–41 are locked against one another and so the mandrels are held in position and at the same are centered.

The mandrels 16 are each provided with a central longitudinal bore 43 which at its radially inner end is provided with a widened portion 44, in which a spring 45 is located, on end of which rests against a shoulder 46 whilst the other end rests against a thickening or bulge 47 at the end of a valve rod 48 passing centrally through each longitudinal bore 43. The springs 45 thus press the valve rods 48 radially inwards, so that a valve head 49 on the free end of each valve rod is also drawn inwardly against a valve seat 50 and thus closes the longitudinal bore 43 of the mandrel 16 at its free end. The valve rods 48 have a cross-sectional area which is smaller than the cross-sectional area of the central channels 43. The same applies with regard to the cross-sectional area of the bulge 47 on the inner end of the valve rods 48 (see FIG. 4). This design makes it possible for the blowing air to pass unobstructed through the mandrels 16. A form has been chosen in respect of the valve rods 48 and also of the thickenings 47 which at the same time allows a guiding of these parts along the walls of the bores 43 and the widened portions 44.

The mandrel-mounting member 17 at its side facing away from the splined shaft 18 is provided with recesses 51, one recess for each mandrel 16. Furthermore, bushings 52, which are formed with longitudinal channels 53, are provided for the feeding of the pressure medium from a suitable supply. The end sections 54 of the bushings 52 are so dimensioned that they can be inserted in the recesses 51. By means of conical surfaces 55 and 56 on member 17 and bushing 52 an airtight seal is achieved between the different bushings and the member 17 and the corresponding recess 51. During the opening phase already described the member 17 is removed from the bushings 52, which therefore do not obstruct the rotation of 180°, to which the member 17 is subjected, after the opening process has taken place. In the source of the subsequent closing movement of the mold in the direction opposite to that of the arrow 30, the bushings 52 are then reintroduced into those recesses 51 which are associated with the blow mold cavities 13'. The bushings 52 can be slightly adjusted in their longitudinal direction, and they are urged upwardly by springs 57 (FIG. 2), which ensure that the conical surfaces 55 and 56 are always under a certain pressure, so that sufficient tightness is guaranteed. In the second place the slight adjustability of the bushings 52 has the advantage that no excessive demands have to be made on the accuracy of the fitting surfaces. Furthermore, the conical surfaces 56 of the bushings 52 can be fitted on a gasket 58 which, it it is made of appropriate resistant material such as rubber, enhances the effect of the spring 57. Since in the embodiment represented in FIGS. 1 to 4 two blow mold cavities are used, two bushings 52 have to be present which are arranged vertically above one another.

The diagram indicates that the valve rods 48 and the bulges 47 at their end are pressed into the recesses 51 by the springs 45. The insertion of the bushings 52 in the course of the closing movement of the molds 12 and 13 into the corresponding recesses 51 of the mandrel mounting 17 has the result that the valve rods 48 are pushed outwards by the bushings 52. This forces a lifting of the particular valve head 49 from the corresponding valve seat 50, so that when the closing movement has been completed, the pressure medium can be passed from the bushing 52 and the longitudinal channel 53 inside it, through the recess 51 and the mandrel 16 so as to expand the parison. The arrangement is such that the flow resistances are as low as possible. Thus the inner region 59 of the recesses 51 receiving the bushings is provided with a greater diameter so as to form an annular duct 60 for the passage of the air. For the same purpose the bulges 47 on the valve rods 48 are tapered on their side facing the bushings 52.

The movement of the mounting plate 15 is caused by two nonrotatable spindles 61, which are axially displaceable by nuts 62 which are driven in a suitable manner via a pinion 63 by a motor. Each spindle 61 is connected by way of a split clamping ring 64 with the piston rod 65 of a hydraulic pressure element 66, the arrangement being such that the free end of the spindle 61 which presses on the substantially plane end face 67 of the piston rod 65 is thickened at 68. Furthermore the two clamping rings 64 are connected by a transverse member (not shown) so as to prevent, in any case, any rotation of the spindle about its longitudinal axis. The closing of the molds 12 and 13 by displacement of the mounting plate 15 in the direction opposite that of the arrow 30 is caused, down to the final millimeters, exclusively by the spindles 61. The remaining locking movement is then accomplished by actuation of the pressure elements 66. In this manner a relatively small and uncomplicated hydraulic device can be used. Moreover it is possible with the help of the pressure elements 66 to attenuate the closing of the locking movement. Furthermore, the interposition of the pressure elements imparts a certain elasticity in respect of the final phase of the closing movement, so that here again no excessive demands have to be made on the accuracy with regard to fittings and the controlling of the drive. It will be appreciated that the combination of the spindle drive with the pressure elements is considerably cheaper than an actuation of the mounting plate for the opening and closing exclusively by a hydraulic device.

Figure 5:
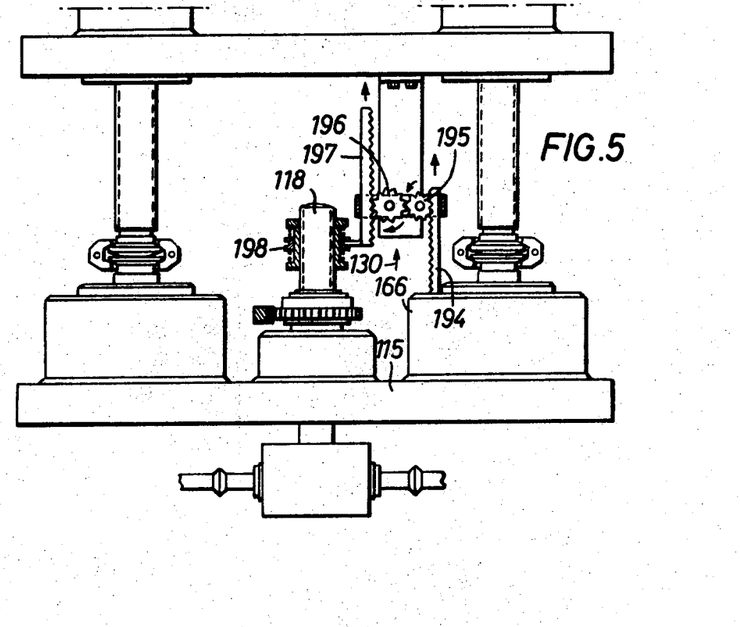
FIG. 5 is a view similar to FIG. 2 of a portion of a modified construction.
Figure 6:
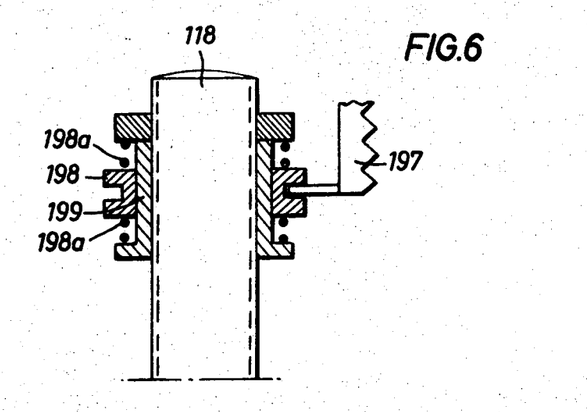
FIG. 6 is a detail of FIG. 5 on a larger scale.

FIGS. 5 and 6 show a modified form of the parts causing the relative movement between shaft and movable locking plate. In respect of the rest of the embodiment, FIGS. 5 and 6 are identical with that of FIGS. 1 to 4, so that for identical parts the same reference numerals increased by 100 have been used.

FIG. 5 shows that the movable mounting plate 115 and the pressure element 166 carried by the same are provided with a rack 194 which actuates a gearwheel 195, which mates with a gearwheel 196 which in turn drives a rack 197 carried by the shaft 118. The size of the two gearwheels 195 and 196 has been so chosen that the movement is transferred from the rack 194 to the rack 197 at a ratio of 2:1. The opening movement of the locking plate 115 in the direction of the arrow has the result that the rack 197 is moved in the same direction at half the speed, i.e., that in contrast to the embodiment of FIGS. 1 to 4 the shaft, directly from the start of the opening movement, is subjected to a relative displacement in relation to the locking plate 115. The same applies therefore to the mandrels carried by the shaft 118 which follow the opening movement at half the speed of the mounting plate 115. This means that directly from the start of the opening movement the mandrels, with the parisons or finished articles carried by them, are separated on both sides from the parts of the mold fitting to the mounting plates. This may have certain advantages over the embodiment described with reference to FIGS. 1 to 4 in connection with the parisons, since these experience the same "treatment" over their whole perimeter. This is not necessarily the case in the embodiment of FIGS. 1 to 4, since one side of the parison remains in contact with one-half of the mold during half the opening movement. Normally this will have no detrimental effect. It is conceivable however that in the case of particularly sensitive plastics this could lead to effects which if possible should be avoided.

In the closing movement of the mounting plate 115, the return movement of the splined shaft 118 also takes place by way of the procedure described above, that is parts 194, 195, 196, and 197 whereas in the embodiment of FIGS. 1 to 4, after half the closing path has been covered, the spring 29 is released and the splined shaft and consequently the mandrels are taken along directly by the mounting plate 15.

FIG. 6 shows that the rack 197 engages into a ring 198 which, with interposition of springs 198a on both sides, is arranged as a sliding fit on a sleeve 199, which in turn is mounted on the splined shaft 118. This arrangement has the advantage that especially at the closing movement a certain attenuation takes place. In particular jamming, squeezing etc., is avoided, since the rack 197 is able to yield slightly axially with respect to the shaft.

Figure 7:
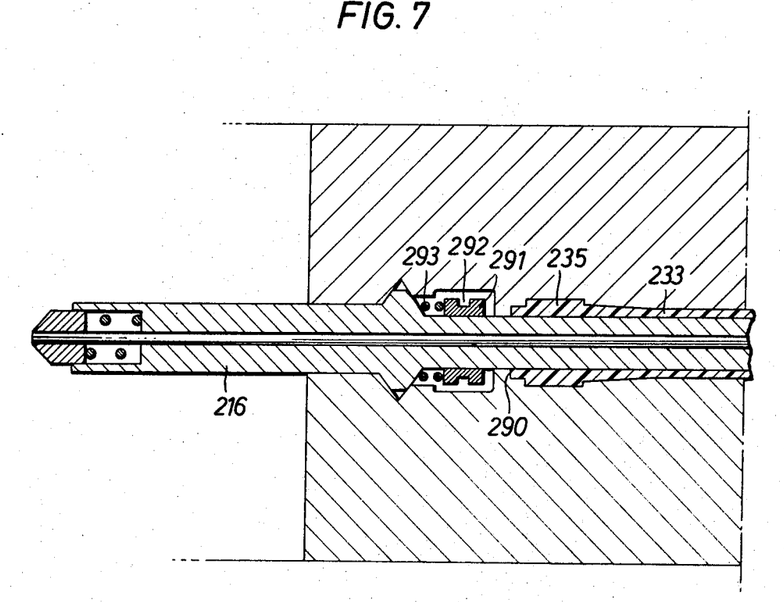
FIG. 7 is a longitudinal section through an injection mold.

FIG. 7 shows a further possible form of the devices for stripping the finished hollow articles from the mandrel. Here again the same numbers are used for parts corresponding to those of embodiment of FIGS. 1 to 4, but increased by 200. The mandrel 216 shown in FIG. 7, adjacent to the end zone of the parison 233 designed as a bottleneck, is provided with a stripper sleeve 291 at a distance from the front face 290 of the bottle neck so that it can be moved longitudinally thereof. After the opening of the blow mold the sleeve 291 is displaced towards the bottleneck, where it makes contact with the front face of the same and strips the hollow article off the mandrel 216. The sleeve 291 on its outside is provided with a groove 292 into which engages, in the course of the swivel movement which the mandrel carries out after the opening of the blow mold, a camming device, for example similar to the part 34 shown in FIG. 1. Displacement of the sleeve 291 in the direction towards the bottle neck 235 is effected against the action of the spring 293, which restores the sleeve 291 into its starting position, as soon as its engagement with the aforementioned camming device is interrupted. Such a sleeve can of course be fitted on any mandrel, regardless of the remainder of its design.

To achieve an alignment and centering of the mandrels in relation to the molds, the mandrels are provided with a double-tapered collar 89 (FIGS. 2 and 3) which cooperates with a corresponding recess 89a of the molds.

It has already been mentioned that in the embodiment of FIGS. 1 to 4, the injection mold and blow mold cavities are always arranged in pairs. Consequently the injection molding machine is also provided with two injection nozzles 78. Both injection nozzles are surrounded by a double conical collar 79, which cooperates with correspondingly shaped faces 80 of the injection mold halves. The injection molding machine 10 is stationary with respect to the opening and closing movement of the injection mold 12. By means of the double-tapered faces an accurate alignment of the parts with respect to one another is guaranteed in every case. This is assisted of course also by the fact, as already mentioned, that the injection molding machine can be stationary. The so-called feedhead or spine is torn off in the course of the transverse displacement of the mandrels at the opening movement of the molds 12 and 13. This means therefore that at the carrying out of the swiveling movement of the mandrels 16, the mandrels and injection nozzles are laterally displaced relative to one another. This represents an advantage in as much as several mold cavities are present, which are next to one another in the direction of the circular movement described by the mandrels. In view of the lateral displacement of the mandrels 16 with respect to the injection nozzles 78 prior to the start of the rotary movement, the position of the circle described by the free ends of the mandrels in relation to the position of the injection nozzles need not be taken into consideration.

Although it has been mentioned earlier, that the injection molding machine may be stationary, this does not exclude of course that devices exist (81 and 82 respectively) for the lateral and height adjustment, so as to allow adapting the position of the injection molding machine 10 to existing conditions, which may for example depend on the size of the mold.

The embodiments depicted in FIGS. 8 to 13 differ from one another only by the number of mandrels so that they can be discussed jointly, the same numbers as in FIGS. 1 to 4 increased by 300, being used for corresponding parts.

The embodiments according to FIGS. 8 to 13 consist essentially of an injection molding machine 310 with a crosshead injection head 310a and a mounting frame 311 underneath it with injection molds and blow molds 312 and 313 respectively attached thereto. The mold halves 312a and 313a are carried by a common stationary mounting plate 314. The two mold halves 312b and 313b are fitted separately onto two separate mounting plates 315 and 315', which are arranged so that they can reciprocate. They are actuated by two hydraulic cylinders 366 and 366' respectively, which are carried by the stationary mounted plate 314. The free ends of the piston rods 361 and 361' are connected to transverse members 331 and 331', which in turn are connected to spars 386 and 386' running parallel with the piston rods and beside the molds 312 and 313, the other ends of the spars carrying the two separate mounting plates 315 and 315'. Thus an actuation of the hydraulic cylinders 366 and 366' brings about an opening or closing of the two molds 312 and 313.

The two transverse members 331 and 331' are jointed to one another by crosspieces 307, which synchronize the movement of the two cylinders and the mold halves 312b and 313b.

Figures 8, 13:
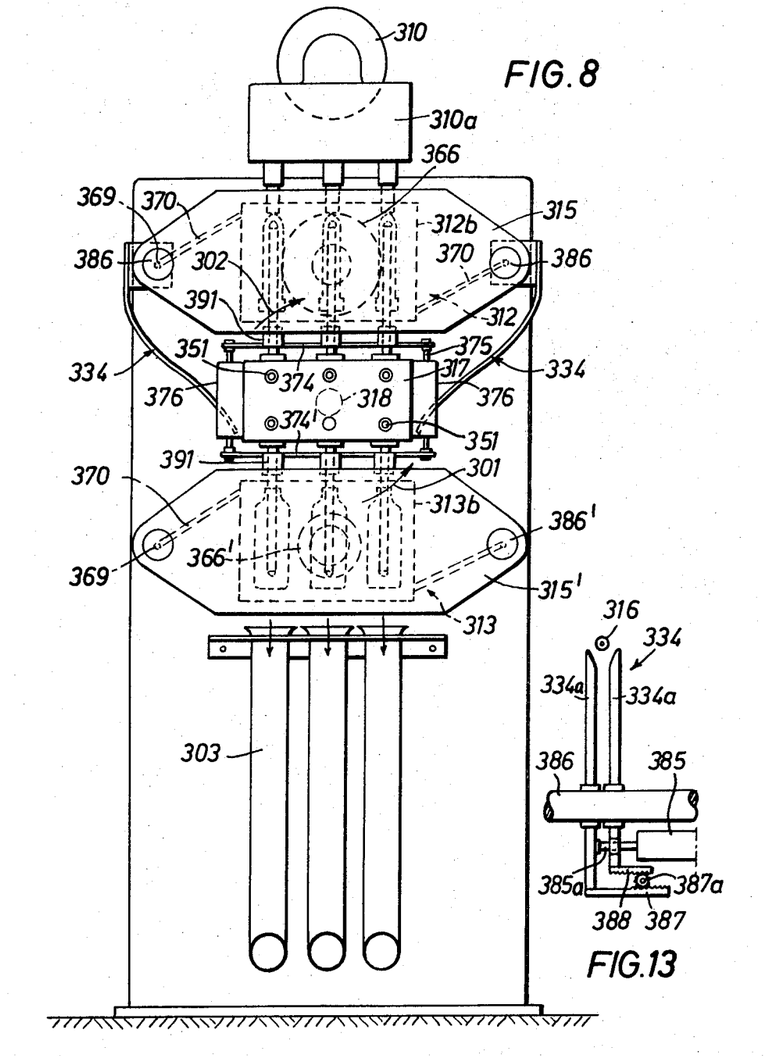
FIG. 8 is a front elevation of a further embodiment of the invention.
FIG. 13 is a further detail of the apparatus of FIGS. 8 to 10 in side elevation.
Figure 9:
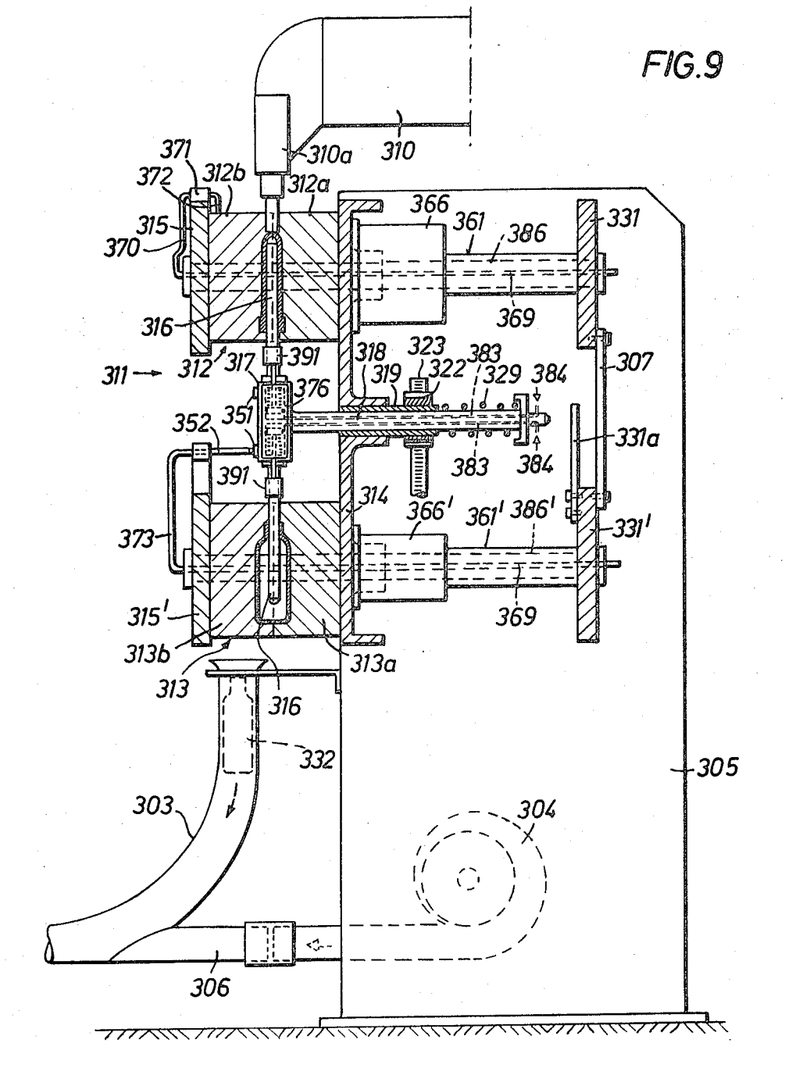
FIG. 9 is the side elevation, partly in section, of the apparatus of FIG. 8.
Figure 10:
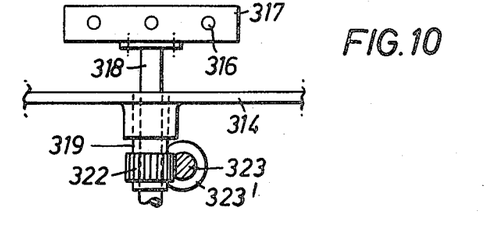
FIG. 10 is a detail of the apparatus of FIGS. 8 and 9 in plan view, partly in section.

Furthermore, several mandrels 316 are provided, the number of which corresponds to the total of the mold cavities present in the molds 312 and 313. In the embodiment of FIGS. 8 to 10 three injection mold and three blow mold cavities are provided. This embodiment therefore has a total of six mandrels 316. In the embodiment of FIGS. 13 and 14, four mandrels, that is to say two mold cavities for each phase, are provided.

The mandrels are carried by a pivoting mounting member 317, which is connected detachably on a shaft 318 which moves inside a sleeve in such a way that it can be displaced longitudinally. On the sleeve 319 a pinion 322 is fitted which can be driven by way of a rack 323 by a hydraulic or pneumatic cylinder 323' (FIG. 10). The mounting member 317 with the mandrels 316 in the embodiment according to FIGS. 8 to 10 thus carries out a reciprocating rotary movement. For the rest, the design of the parts cooperating with the shaft 318 agrees with the embodiment of FIGS. 1 to 4. The function of the stop displacing the shaft in its longitudinal direction against the action of a spring 329 is assumed here by an extension 331a of the transverse member 331'.

The feed of the blowing air to the mandrels 316 takes place in the same manner as in the apparatus of FIGS. 1 to 4. Thus, the bushings 352 carried by the movable locking plate 315' are provided, which with the mold closed engage in the correspondingly arranged recesses 351 of the mandrel mounting 317. In the equipment of FIGS. 8 to 10, altogether six such recesses 351 and three bushings are provided, and in the apparatus of FIGS. 11 to 12 four recesses 351 and two bushings 352 are provided.

The spars 386 and 386' are provided with longitudinal bores 369 which serve for feeding cooling and/or heating medium to the mold halves 312b and 313b carried by the mounting plates 315 and 315' respectively. In FIG. 8 of the drawing, the appropriate connecting lines 370 are indicated schematically. The arrangement is generally such that the cooling or heating medium, generally water, is fed through one of the two spars and is discharged through the other spar. The connection between the channel 369 inside the spar 386 and the mold half 312a is shown in more detail in FIG. 9. From the free end of the spar 386a tube or hose line 370 goes to a distributor 371, from where then further distributor lines 372 take the cooling or heating medium to the different mold cavity areas. For the rest, it is also possible to feed through one of the longitudinal channels at 369 inside the spars 386 and 386' the pressure medium required for the expanding of the parisons inside the blow mold 313. FIG. 9 shows a resilient twistable connecting line 373 between the longitudinal channel 369 of one of the lower spars 386' and the bushings 352 which, with the mandrels closed, can be inserted in the recesses 351 of the mounting member 317. It may also be possible to provide inside the spars several longitudinal channels running side by side, so that for example cooling medium and pressure medium can be introduced.

Figures 11, 12:
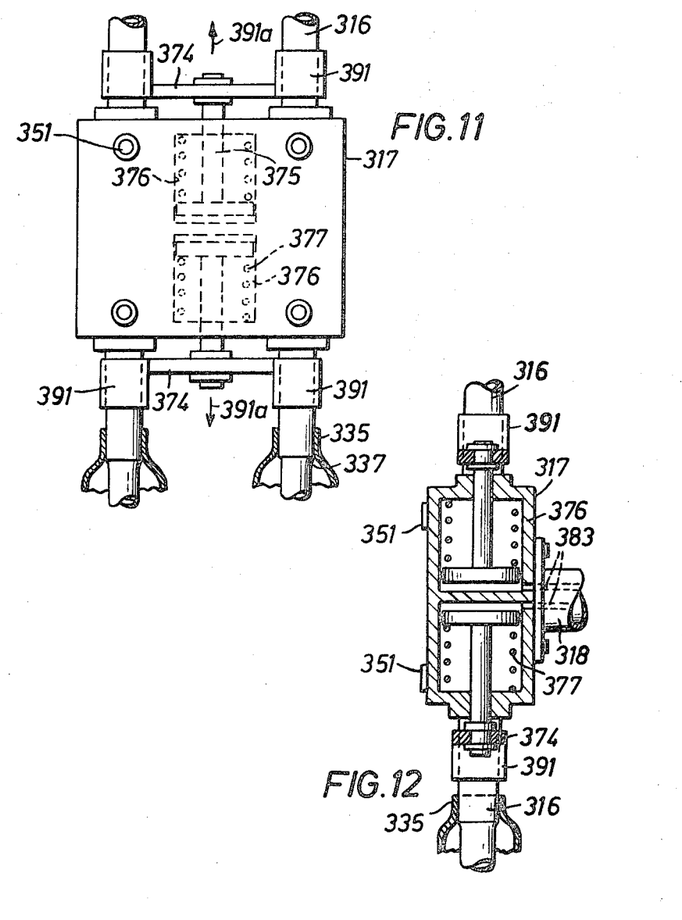
FIG. 11 is a front elevation of a detail of a modification of the apparatus of FIGS. 8 to 10.
FIG. 12 is a side elevation, partly in section, of the apparatus of FIG. 11.

In the embodiment shown in FIGS. 8 to 13, the mounting member 317 is provided with special strippers. These consist of sleeves 391, surrounding the mandrels 316 near the mounting members 317, which can be displaced to a certain degree in longitudinal direction of the mandrels. These sleeves 319 are so arranged that they are outside the molds 312 and 313 when these are closed. All the sleeves 391 on one side of the mounting 317 are carried by a common transverse member 374, which in turn is connected with the piston rod 375 of one or two cylinders 376, which are carried by the mounting member 317. In the embodiment of FIGS. 8 to 10, the cylinders are arranged at the sides of the mounting, altogether four cylinders being present. In the embodiment of FIGS. 11 and 12 two cylinders are provided in the center of the mounting 317. When the cylinders 376 are charged with the pressure medium the transverse member 374, and consequently also the sleeves will be displaced in the direction of the arrow 391a (FIG. 11), that is in the direction of the free end of the related mandrel 316. In the course of this movement the sleeves 391 come to a rest at the front face of the hollow bodies present on the particular mandrels 316 and take these along with them, so that the hollow bodies drop off the mandrel, since the mandrels are then pointing downwards. Since this is the case only in the blowing station, that is on those mandrels 316 which are present between the halves of the blow mold 313, the arrangement is made such that the cylinders 376 of both sides can be actuated independently of each other. The return movement of the strippers 391 is effected by springs 377 surrounding the piston rods 375.

For the cylinders 376 actuating the strippers 391 a separate compressed air feed is provided. This consists of longitudinal bores 383 present in the shaft 318. Each of these longitudinal bores is connected with the cylinders 376 assigned to the same side of the mandrel mounting member 317 (FIG. 12). The connection to a source of pressure medium can, if the mandrels perform a reciprocating swivel movement, be done by way of tubes which in FIG. 9 are indicated by arrows 384. It is of course also possible to use the longitudinal channels 383, or one of them, for the introduction of the blowing air by means of which the parisons are expanded inside the blow mold 313. In this case the bushings 352 would only have the function of closing the recesses 351 and actuate the valves of the mandrels 316, as explained in connection with FIG. 3.

It is to be assumed that in general the strippers 391 will be displaceable only over a short distance along the associated mandrels 316. This will be sufficient under normal operating conditions for the removal of the finished bottles 332 (FIG. 9) from the mandrels 316, especially since the mandrels directly behind the bottle neck 335 have a recess 337 (FIGS. 11 and 12). It has to be reckoned however that in exceptional cases the parison fabricated in mold 312 by the injection molding process might not be expanded in the next operating stage in the blow mold 313, e.g., because of disturbances in the supply of compressed air, or because of the article tearing. In such a case, after the opening of the blow mold the parison would stick to the mandrel 316 over its whole length, so that the corresponding stripper 391 will possibly not be able completely to remove this parison from the mandrel. To take care of such possibilities, it is appropriate to provide further strippers 334 (FIGS. 8 and 13). These strippers, carried by the spars 386 each consist of two bars 334a which are displaceable in longitudinal direction of the spars 386. This may be done by means of a cylinder 385, the piston rod 385a of which attacks on one of the bars 334a. This is provided with a rack 387 which mates with pinion 387a, which engages a rack 388 of the second bar 334a.

In FIG. 13 the two bars 334a are at their minimum mutual distance. This is dimensioned so that it is slightly greater than the diameter of the mandrels 316. These pass, in the course of their swiveling movement, one of the two strippers 334, so that any articles still present on the mandrel will be stripped off by the two bars 334a. The adjustability of the strippers caused by the cylinders 385 is necessary when the direction in which the mandrels 316 are swiveled, is changed. For a swivel movement in the direction of the arrow 301 the two bars 334a of the stripper shown on the right in FIG. 8 move into their position of smallest distance as seen in FIG. 13, so that any bodies that might still be present on the mandrels are removed. During this swiveling movement, those mandrels, which at the start of the movement were up in the injection mold, now get into the range of the left-hand additional stripper 334. To prevent the moldings being touched by the two bars 334a of this stripper, it is necessary to move these bars so far apart that their distance in all cases is greater than the greatest diameter of the parisons, this being effected by the cylinder 385 (FIG. 13).

When the direction of rotation is opposite (302) the arrangement is exactly opposite. The two bars 334a of the left-hand stripper must then be brought into their effective position, that is that of minimum distance, whilst the bars 334a of the right-hand stripper 334 have moved apart.

The adjustability of the distance of the two bars 334a of the additional strippers becomes superfluous, if the rotary movement of the mandrel mounting 317 and thus of the mandrels occurs only in one direction. In that case only one additional stripper 334 need be provided, that is on the side where the mandrels are moved upwards.

Underneath the blow mold 313 tubular transport ducts 303 are provided into which the hollow bodies, formed into bottles 332, are stripped from the mandrels. These ducts 303 are so arranged that in the open position of the blow mold 313 the mandrels are above the ducts 303, which are equipped with fans 304 which are fitted in the machine frame 305 of the equipment and are connected by pipes 306 with the transport ducts. The latter convey the finished bottles to a piece of downstream equipment where the bottles are processed in some manner, e.g., printed, filled or packaged.

In FIGS. 8 and 9 the molds are shown in closed position. Here in the injection mold 313 altogether three parisons are fabricated by injection of the material from the injection head 310a, and at the same time three previously injected parisons are expanded in the blow mold 313. After completion of these operations and sufficient solidifying of the hollow bodies in the blow mold 313, the two molds are opened. This is done by actuation of the hydraulic cylinders 336 and 336'. By means of the crosspiece 307 a synchronized movement of the two pistons in this cylinder, and consequently also of the mounting plates 315 and 315' is guaranteed. Approximately after covering half the opening path the shaft 318 is taken along by the extension 331a of the transverse member 331' so that the mandrels 316 are moved into the center between the two mold halves of the opened molds. Now the bottles carried by the mandrels 316 pointing downwards are pushed down by the stripper 391 to such an extent that they fall off the mandrels 316 and into the transport ducts 303.

After stripping of the bottles off the mandrels 316 pointing downwards the mounting member 317 is swiveled through 180°, so that the mandrels, previously pointing downwards and now empty go upwards into the range of the injection mold 312, and the mandrels carrying the parisons swivel down between the two halves of the blow molds. After this swiveling movement has been completed, the cylinders 366 and 366' are operated in the opposite direction, so that the molds are now closed by moving the mold halves 312b and 313b towards the stationary mold halves 312a and 313a. The spring 329 at the same time causes a linear movement of the shaft 318 into the starting position illustrated in FIG. 9. After completion of the locking process the parisons are formed again in the injection molds and in the blow mold the parisons formed in the previous operating phase are expanded.

I claim:

1. In an apparatus for making hollow thermoplastic bodies, said apparatus being of the known type that includes (1) at least one injection mold for making parisons, (2) means for injecting plastic material into said injection mold, (3) at least one blow mold for expanding said parisons, (4) a plurality of blow mandrels each adapted to be alternately positioned in an injection mold to serve as a core about which a parison is formed by injection molding and in a blow mold to serve as a blowpipe to expand the parison, (5) means for angularly displacing said blow mandrels as a unit about an axis from said injection mold to said blow mold and conversely and (6) means admitting pressurized fluid to said blow mandrels when in said blow mold, the improvement comprising, A. a machine frame,
B. a first mounting plate affixed to said machine frame and stationary relative thereto; a first half of each injection mold and of each blow mold being fixedly secured to said first mounting plate,
C. a second mounting plate disposed parallel to said first mounting plate; a second, complemental half of each injection mold and of each blow mold being fixedly secured to said second mounting plate; said second mounting plate being movable towards and away from said first mounting plate in opposed directions normal thereto for causing said injection molds and blow molds to assume together a closed position and an open position in an alternating sequence,
D. means for movably securing said second mounting plate to said machine frame,
E. a mounting member carrying said blow mandrels and disposed between said first and second mounting plates, said mounting member being rotatable about said axis and displaceable therealong with respect to said mounting plates,
F. connecting means for attaching said mounting member to said second mounting plate,
G. means for rotating said mounting member through said connecting means with respect to said mounting plates,
H. means for moving said mounting member with said second mounting plate in unison during an initial displacement of said mounting member away from said first mounting plate, and
I. means for stopping said mounting member after said initial displacement while said second mounting plate continues its movement away from said first mounting plate.

2. An improvement as defined in claim 1, wherein said means defined in (F) and (I) include a part affixed to said mounting member and slidably held in said second mounting plate, said part having an end adapted to abut against said machine frame to cause said mounting member to stop as said second mounting plate, together with said part, is moved away from said first mounting plate.

3. In an apparatus for making hollow thermoplastic bodies, said apparatus being of the known type that includes (1) at least one injection mold for making parisons, (2) means for injecting plastic material into said injection mold (3) at least one blow mold for expanding said parisons, (4) a plurality of blow mandrels each adapted to be alternately positioned in an injection mold to serve as a core about which a parison is formed by injection molding and in a blow mold to serve as a blowpipe to expand the parison, (5) means for angularly displacing said blow mandrels as a unit about an axis from said injection mold to said blow mold and conversely and (6) means admitting pressurized fluid to said blow mandrels when in said blow mold, the improvement comprising,
  A. a machine frame,
  B. a first mounting plate affixed to said machine frame and stationary relative thereto; a first half of each injection mold and of each blow mold being fixedly secured to said first mounting plate,
  C. a second mounting plate disposed parallel to said first mounting plate; a second, complemental half of each injection mold and of each blow mold being fixedly secured to said second mounting plate, said second mounting plate being movable towards and away from said first mounting plate in opposed directions normal thereto for causing said injection molds and blow molds to assume together a closed position and an open position in an alternating sequence,
  D. means for movably securing said second mounting plate to said machine frame,
  E. a mounting member carrying said blow mandrels and disposed between said first and second mounting plates, said mounting member being rotatable about said axis and displaceable therealong with respect to said mounting plates,
  F. connecting means for attaching said mounting member to said first mounting plate,
  G. means for rotating said mounting member through said connecting means with respect to said mounting plates, and
  H. means for moving said mounting member away from said first mounting plate in the direction of said second mounting plate subsequent to an initial movement of the latter directed away from said first mounting plate.

4. An improvement as defined in claim 3, wherein said means defined in (F) and (H) include a part affixed to said mounting member and slidably held in said first mounting plate, said part having an end adapted to abut against an element forming part of the means defined in (D) and moving in unison with said second mounting plate to cause said mounting member to move with respect to said first mounting plate subsequent to an initial movement of said second mounting plate directed away from said first mounting plate.

5. In an apparatus for making hollow thermoplastic bodies, said apparatus being of the known type that includes (1) at least one injection mold for making parisons, (2) means for injecting plastic material into said injection mold, (3) at least one blow mold for expanding said parisons, (4) a plurality of blow mandrels each adapted to be alternately positioned in an injection mold to serve as a core about which a parison is formed by injection molding and in a blow mold to serve as a blowpipe to expand the parison, (5) means for angularly displacing said blow mandrels as a unit about an axis from said injection mold to said blow mold and conversely and (6) means admitting pressurized fluid to said blow mandrels when in said blow mold, the improvement comprising,
  A. a machine frame,
  B. a first mounting plate affixed to said machine frame and stationary relative thereto; a first half of each injection mold and of each blow mold being fixedly secured to said first mounting plate,
  C. a second mounting plate disposed parallel to said first mounting plate and formed of two plate parts; a second, complemental half of each injection mold being fixedly secured to one of the plate parts; a second complemental half of each blow mold being fixedly secured to the other of said plate parts; said plate parts movable towards and away from said first mounting plate in opposed directions normal thereto for causing said injection molds and blow molds to assume together a closed position and an open position in an alternating sequence,
  D. means for movably securing said second mounting plate to said machine frame, said last-named means having two separate power means, one associated with each of said plate parts to effect movement thereof,
  E. a mounting member carrying said blow mandrels and disposed between said first and second mounting plates, said mounting member being rotatable about said axis and displaceable therealong with respect to said mounting plates, and
  F. means for rotating and axially displacing said mounting member and securing the latter to one of said mounting plates.

6. An improvement as defined in claim 5, including
  A. a plurality of spars, one connected to each said power means and a plate part and
  B. channel means extending longitudinally inside said spars for carrying a fluid therein.

7. An improvement as defined in claim 6, including connecting lines leading from said channel means to said molds to change the temperature of the latter by said fluid flowing through said lines from said channel means.

8. In an apparatus for making hollow thermoplastic bodies, said apparatus being of the known type that includes (1) at least one injection mold for making parisons, (2) means for injecting plastic material into said injection mold, (3) at least one blow mold for expanding said parisons, (4) a plurality of blow mandrels each adapted to be alternately positioned in an injection mold to serve as a core about which a parison is formed by injection molding and in a blow mold to serve as a blowpipe to expand the parison, (5) means for angularly displacing said blow mandrels as a unit about an axis from said injection mold to said blow mold and conversely and (6) means admitting pressurized fluid to said blow mandrels when in said blow mold, the improvement comprising,
  A. a machine frame,
  B. a first mounting plate affixed to said machine frame and stationary relative thereto; a first half of each injection mold and of each blow mold being fixedly secured to said first mounting plate,
  C. a second mounting plate disposed parallel to said first mounting plate; a second, complemental half of each injection mold and of each blow mold being fixedly secured to said second mounting plate; said second mounting plate being movable towards and away from said first mounting plate in opposed directions normal thereto for causing said injection molds and blow molds to assume together a closed position and an open position in an alternating sequence,
  D. means for movably securing said second mounting plate to said machine frame,
  E. a mounting member carrying said blow mandrels and disposed between said first and second mounting plates; said mounting member being rotatable about said axis and displaceable therealong with respect to said mounting plates,
  F. connecting means for attaching said mounting member to one of said mounting plates, and
  G. a stepdown means operatively connecting said second mounting plate with said mounting member to cause a displacement of said mounting member simultaneously and unidirectionally with the motion of said second mounting plate and with a rate of displacement less than that of the latter.

9. An improvement as defined in claim 8, wherein said stepdown means includes
A. a first toothed rack associated with said mounting member,
B. a second toothed rack associated with said second mounting plate, and
C. a pair of pinions of different size meshing with one another, the smaller of said pinions further meshes with the rack associated with said second mounting plate and the larger of said pinions further meshes with the rack associated with said mounting member.

10. In an apparatus for making hollow thermoplastic bodies, said apparatus being of the known type that includes (1) at least one injection mold for making parisons, (2) means for injecting plastic material into said injection mold, (3) at least one blow mold for expanding said parisons, (4) a plurality of blow mandrels each adapted to be alternately positioned in an injection mold to serve as a core about which a parison is formed by injection molding and in a blow mold to serve as a blow pipe to expand the parison, (5) means for angularly displacing said blow mandrels as a unit about an axis from said injection mold to said blow mold and conversely and (6) means admitting pressurized fluid to said blow mandrels when in said blow mold, the improvement comprising, stripping means associated with said blow mandrels to axially remove an expanded article therefrom upon the withdrawal of the blow mandrel from said blow mold, said stripping means including at least one pair of cooperating stripper bars adjacent said mandrels, said stripper bars are so situated that each blow mandrel passes therebetween during its angular displacement from said blow molds to said injection molds, whereupon said bodies carried by said blow mandrels are pulled therefrom by said stripper bar pair.

11. An improvement as defined in claim 10, including means for moving the stripper bars forming one pair toward one another into an operative position and away from one another into an inoperative position; said stripper bars, when in said operative position, pulling said bodies off said mandrels as the latter pass therebetween from said blow molds to said injection molds; said stripper bars, when in said inoperative position, allow to pass with a clearance said parisons carried by said blow mandrels from said injection molds to said blow molds.

12. In an apparatus for making hollow thermoplastic bodies, said apparatus being of the known type that includes (1) at least one injection mold for making parisons, (2) means for injecting plastic material into said injection mold, (3) at least one blow mold for expanding said parisons, (4) a plurality of blow mandrels each adapted to be alternately positioned in an injection mold to serve as a core about which a parison is formed by injection molding and in a blow mold to serve as a blowpipe to expand the parison, (5) means for angularly displacing said blow mandrels as a unit about an axis from said injection mold to said blow mold and conversely and (6) means admitting pressurized fluid to said blow mandrels when in said blow mold, the improvement comprising,
A. a mounting member for carrying said blow mandrels,
B. means for fixedly attaching one end of each blow mandrel to said mounting member,
C. a plurality of outwardly open recesses provided in said mounting member, each said recess pneumatically connectable with an axial bore of a blow mandrel,
D. a valve means disposed in each blow mandrel to maintain the axial bore thereof in a normally closed position, each valve means including a spring means to maintain each valve means in a normally closed position and a terminus projecting into the associated recess,
E. a hollow bushing means supplying a pressure medium to a selected blow mandrel when positioned in said blow mold for expanding said parison, said hollow bushing means being dimensioned to fit into any selected one of said recesses,
F. means for introducing said hollow bushing means into and withdrawing it from, any selected one of said recesses and
G. means for opening said valve means to permit introduction of said pressure medium from said bushing means through said axial bore for expanding said parison in said blow mold, said means for opening said valve means including a portion of said hollow bushing means displacing said terminus against the force of said spring means to open the axial bore of the blow mandrel when said hollow bushing means is introduced into one of said recesses of said mounting member.

13. An improvement as defined in claim 12, wherein each said valve means includes
A. a valve rod extending in said axial bore of said blow mandrel and displaceable axially with respect thereto,
B. a valve head integral with said valve rod and extending beyond a downstream terminal opening of said blow mandrel,
C. a spring urging said valve rod towards said mounting member to pull said valve head into a seated, closed position against said downstream terminal opening and
D. an upstream terminal or bulged portion forming integral part of said valve rod and projecting into the recess associated with the blow mandrel.

* * * * *